United States Patent
Charron

(10) Patent No.: US 8,616,007 B2
(45) Date of Patent: Dec. 31, 2013

(54) STRUCTURAL ATTACHMENT SYSTEM FOR TRANSITION DUCT OUTLET

(75) Inventor: Richard Charron, West Palm Beach, FL (US)

(73) Assignee: Siemens Energy, Inc., Orlando, FL (US)

( * ) Notice: Subject to any disclaimer, the term of this patent is extended or adjusted under 35 U.S.C. 154(b) by 1200 days.

(21) Appl. No.: 12/357,607

(22) Filed: Jan. 22, 2009

(65) Prior Publication Data

US 2010/0180605 A1   Jul. 22, 2010

(51) Int. Cl.
*F02C 7/20* (2006.01)

(52) U.S. Cl.
USPC .......................................................... 60/796

(58) Field of Classification Search
USPC ................... 60/796, 797, 800, 799, 752, 760; 415/135, 190; 248/674
See application file for complete search history.

(56) References Cited

U.S. PATENT DOCUMENTS

| | | | |
|---|---|---|---|
| 2,594,808 A * | 4/1952 | Rubbra | 60/39.37 |
| 2,596,646 A | 5/1952 | Buchi | |
| 2,967,013 A | 1/1961 | Dallenbach et al. | |
| 3,184,152 A | 5/1965 | Bourquard | |
| 3,333,762 A | 8/1967 | Vrana | |
| 3,420,435 A | 1/1969 | Jarosz et al. | |
| 3,484,039 A | 12/1969 | Mittelstaedt | |
| 3,609,968 A | 10/1971 | Mierley, Sr. et al. | |
| 3,670,497 A | 6/1972 | Sheldon | |
| 3,743,436 A | 7/1973 | O'Connor | |
| 4,016,718 A | 4/1977 | Lauck | |
| 4,164,845 A | 8/1979 | Exley et al. | |
| 4,368,005 A | 1/1983 | Exley et al. | |
| 4,503,668 A | 3/1985 | Duncan, III et al. | |
| 4,565,505 A | 1/1986 | Woollenweber | |
| 4,566,851 A | 1/1986 | Comeau et al. | |
| 4,948,333 A | 8/1990 | Meer et al. | |
| 5,039,317 A | 8/1991 | Thompson et al. | |
| 5,145,317 A | 9/1992 | Brasz | |
| 5,320,489 A | 6/1994 | McKenna | |
| 5,329,761 A * | 7/1994 | Ablett et al. | 60/804 |
| 5,387,082 A | 2/1995 | Matyscak | |
| 5,441,385 A | 8/1995 | Boyd et al. | |
| 5,494,402 A | 2/1996 | Glezer et al. | |
| 5,630,700 A | 5/1997 | Olsen et al. | |
| 5,706,646 A * | 1/1998 | Wilde et al. | 60/39.37 |
| 6,280,139 B1 | 8/2001 | Romani et al. | |
| 6,589,015 B1 | 7/2003 | Roberts et al. | |
| 6,845,621 B2 | 1/2005 | Teets | |
| 7,918,433 B2 * | 4/2011 | Melton et al. | 248/674 |

(Continued)

FOREIGN PATENT DOCUMENTS

WO    2010036426 A2    4/2010

*Primary Examiner* — Phutthiwat Wongwian

(57) ABSTRACT

A structural attachment system for the outlet of a transition duct includes a structural attachment member that has a step over portion with an outer flange at one end thereof and an inner flange at the other end thereof. The step over portion can project away from the inner and outer flanges and can define an open area. The step over portion can have a cross-section that is generally u-shaped, v-shaped, c-shaped, semi-circular, semi-oval, parabolic, or bowed. A portion of the outlet of a transition duct is received within the step over portion of the structural attachment member. Because of such arrangement, the structural attachment member is not constrained circumferentially to fitting in between two neighboring transition ducts. The structural attachment member can manage the thermal displacements that can occur between the transitions, rotor shaft cover and first row of blades during transient engine operation.

15 Claims, 8 Drawing Sheets

(56) References Cited

U.S. PATENT DOCUMENTS

| | | |
|---|---|---|
| 8,001,787 B2 * | 8/2011 | Sutcu et al. .................. 60/752 |
| 2006/0101828 A1 * | 5/2006 | Patel et al. .................. 60/804 |
| 2006/0127827 A1 | 6/2006 | Yoshida et al. |
| 2006/0288707 A1 | 12/2006 | Weaver et al. |
| 2007/0017225 A1 | 1/2007 | Bancalari et al. |
| 2008/0008584 A1 | 1/2008 | Shteyman et al. |
| 2008/0053107 A1 * | 3/2008 | Weaver et al. .................. 60/800 |
| 2010/0054928 A1 * | 3/2010 | Schiavo .................. 415/182.1 |
| 2012/0200046 A1 * | 8/2012 | Green et al. .................. 277/647 |

* cited by examiner

STRUCTURAL ATTACHMENT SYSTEM FOR TRANSITION DUCT OUTLET

FIELD OF THE INVENTION

The invention relates in general to turbine engines and, more specifically, to a support system for transition ducts.

BACKGROUND OF THE INVENTION

Referring to FIG. 1, a turbine engine 10 can generally include a compressor section 12, a combustor section 14 and a turbine section 16. A centrally disposed rotor 18 can extend through the three sections. Portions of the rotor 18 can be protected by a rotor shaft cover 19.

The turbine section 16 can include alternating rows of vanes 20 and rotating blades 22. Each row of blades 22 can include a plurality of airfoils attached to a disc 24 provided on the rotor 18. The rotor 18 can include a plurality of axially-spaced discs 24. The blades 22 can extend radially outward from the discs 24.

Each row of vanes 20 can be formed by attaching a plurality of vanes 20 to the stationary support structure in the turbine section 16. For instance, the vanes 20 can be mounted on a vane carrier 26 that is attached to the outer casing 28. The vanes 20 can extend radially inward from the vane carrier 26.

In operation, the compressor section 12 can induct ambient air and can compress it. The compressed air 32 from the compressor section 12 can enter a chamber 34 enclosing the combustor section 14. The compressed air 32 can then be distributed to each of the combustors 36 (only one of which is shown). In each combustor 36, the compressed air 32 can be mixed with the fuel. The air-fuel mixture can be burned to form a hot working gas 38. The hot gas 38 can be routed to the turbine section 16 by a duct 42, sometimes referred to as a transition. As it travels through the rows of vanes 20 and blades 22, the gas 38 can expand and generate power that can drive the rotor 18. The expanded gas 40 can then be exhausted from the turbine 16.

During engine operation, the axial and radial displacement of an inner support structure 44 (which can be affected by at least the displacement of the vane carrier 26 and the outer casing 28) and a support structure 46 (which can be affected by displacement of at least the shaft cover 19) at the outlet of the transition duct 42 is not the same due to differential thermal growth and movement of these structures. As a result, there can be relatively large relative movements between these structures 44, 46.

These relative movements can produce high stresses within the first row of vanes. In addition, these relative movements can cause ID-to-OD rocking of the vane between the inner platform element of the vane and the transition duct from the combustor, potentially resulting in substantial gas leakage and loss of efficiency due to the large relative displacement.

One system for addressing such issues in connection with conventional transition duct systems is described in U.S. Patent Application Publication No. 20080008584. In such systems, exhaust flow is directed straight in the axially aft direction. There is a minimum amount of space available between transition ducts to receive a support member. However, there is not enough space for a substantial support member because any support member must be circumferentially narrow to fit in the limited available space between neighboring transitions.

Moreover, such a system cannot be applied to transition ducts that are configured to eliminate the first stage row of turbine vanes. An example of such a transition duct system is described in U.S. Patent Application Publication No. 20070017225. In such systems, the transitions generally supply combustion gases with high tangential velocity directly to a first row of blades. However, such a configuration results in the outlets of the transition ducts being arranged so close together that there is no longer room to physically fit any support members, thereby leaving such systems prone to the transition duct outlet displacement issues similar to those that have plagued systems in the past. Thus, there is a need for a system that can minimize these concerns.

SUMMARY OF THE INVENTION

In one embodiment, aspects of the invention are directed to a structural attachment system for transition duct outlet. The system includes a radially outer support structure, which can be a turbine vane carrier. The system further includes a radially inner support structure, which can be a transition duct ID (inner diameter) support ring or a rotor shaft cover.

The system still further includes a structural attachment member that has a step over portion. The step over portion has a cross-section that is u-shaped, v-shaped and c-shaped, semi-circular, semi-oval, parabolic, or bowed.

The member has an outer flange at a first end of the step over portion and an inner flange at a second end of the step over portion. The outer flange is attached to the radially outer support structure, such as by fasteners The inner flange is attached to the radially inner support structure, such as by fasteners. As a result, the step over portion extends away from the support structures in a generally axial direction.

The system can further include a rotor shaft cover circumferentially surrounded by the transition duct ID support ring. A seal can be positioned between and can operatively engage the rotor shaft cover and the transition duct ID support ring.

In another respect, aspects of the invention are directed to a structural attachment system for transition duct outlet. The system includes a radially outer support structure and a radially inner support structure. The radially outer support structure can be a turbine vane carrier. The radially inner support structure can be a transition duct ID support ring. Alternatively, the radially inner support structure can be a rotor shaft cover.

The system can further include a structural attachment member having a step over portion. The step over portion can have a cross-section that is one of u-shaped, v-shaped, c-shaped, semi-circular, semi-oval, parabolic, or bowed.

The member has an outer flange at a first end of the step over portion and an inner flange at a second end of the step over portion. The outer flange is attached to the radially outer support structure by, for example, fasteners. The inner flange is attached to the radially inner support structure, such as by bolts. The step over portion extends away from the support structures in a generally axial direction. The system also includes a transition duct having an outlet. At least a portion of the outlet is received in the step over portion. At least a portion of the outlet of one or more other transition ducts can be received in the step over portion.

The system can further include a rotor shaft cover circumferentially surrounded by the transition duct ID support ring. A seal can be positioned between and in operative engagement with the rotor shaft cover and the transition duct ID support ring. The inner flange can be attached to the radially inner support structure and a portion of the transition duct. The portion of the transition duct can be sandwiched between the inner flange and the radially inner support structure.

DETAILED DESCRIPTION OF THE INVENTION

Figure 1:
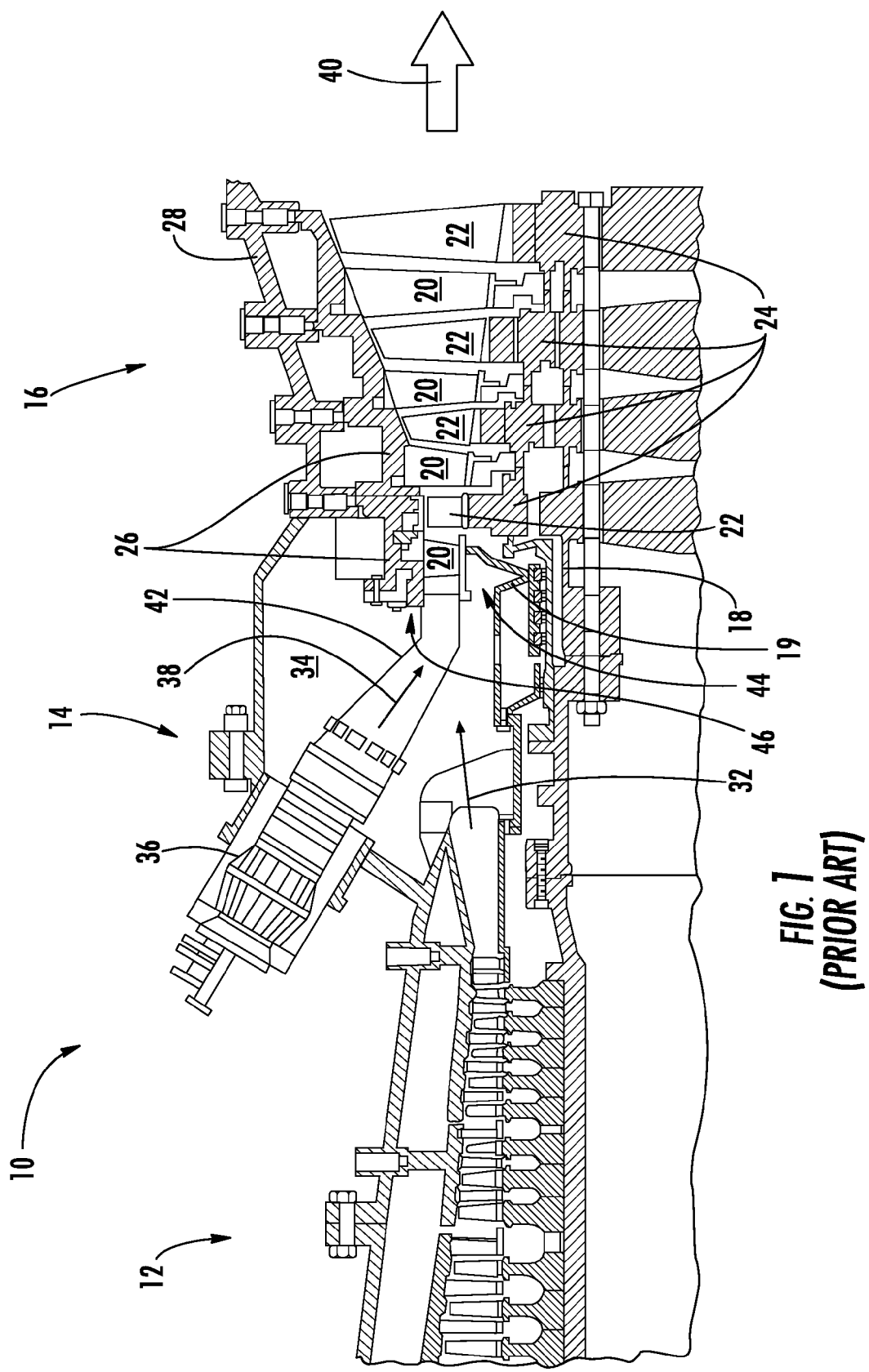
FIG. 1 is a cross-sectional view through a portion of a known turbine engine.

Aspects of the present invention relate to a structural attachment system for the outlet of a transition duct. Embodiments of the invention will be explained in connection with transition ducts that supply combustion gases with high tangential velocity directly to a first row of blades, but the detailed description is intended only as exemplary. Embodiments of the invention are shown in FIGS. 2-10, but aspects of the invention are not limited to the illustrated structure or application.

A system according to aspects of the invention includes a transition outlet structural attachment member 200. The structural attachment member 200 can have a step over portion 202 with an outer flange 204 at one end thereof and an inner flange 206 at the other end thereof. The step over portion 202 can project away from the inner and outer flanges 204, 206 and can define an open area 208. The step over portion 202 can have any suitable configuration. For instance, the step over portion 202 can have a cross-section that is generally u-shaped, v-shaped, c-shaped, semi-circular, semi-oval, parabolic, or bowed, just to name a few possibilities. The inner and outer flanges 204, 206 can be generally planar. It should be noted that the terms "inner" and "outer" are intended to refer to the relative radial position of these features to the turbine axis of rotation when the structural attachment member 200 is installed in the engine.

The structural attachment member 200 can be made of any suitable material. The structural attachment member 200 can be made of a high temperature material. In one embodiment, the support member can be made of a Nickel based alloy. In some instances, the support member can be made of steel. The support member can be made in any suitable manner, such as by machining, stamping and/or casting.

The system according to aspects of the invention can be used in connection with various transition duct systems, such as those in which the transition ducts and first stage vanes are combined so that the first stage vanes are eliminated and so that gases exiting the duct are directed to a row of blades with high tangential velocity. The limited amount of available space and the unique arrangement of the transition ducts in such systems make the system according to aspects of the invention particularly beneficial. FIGS. 3-8 provide examples of transition ducts system in which the system according to aspects of the invention can be employed. These systems will now be briefly described.

A transition duct 94 may have an axis 130 that is generally linear. In such a configuration, the transition duct 94 channels gases from a combustor basket to a downstream turbine blade assembly and accomplishes the task of redirecting the gases, which has been accomplished in conventional systems with row one vanes. Thus, the transition duct 94 eliminates the need for row one vanes. The transition duct 94 may also be configured to include an outlet 100 with canted side surfaces 112, 114 that is configured to reduce the effect of the transition wake thereby resulting in reduced vibration in downstream turbine blades. As such, the outlet 100 reduces inefficiencies caused by the combustor gases exiting the transition duct 94.

Figure 3:
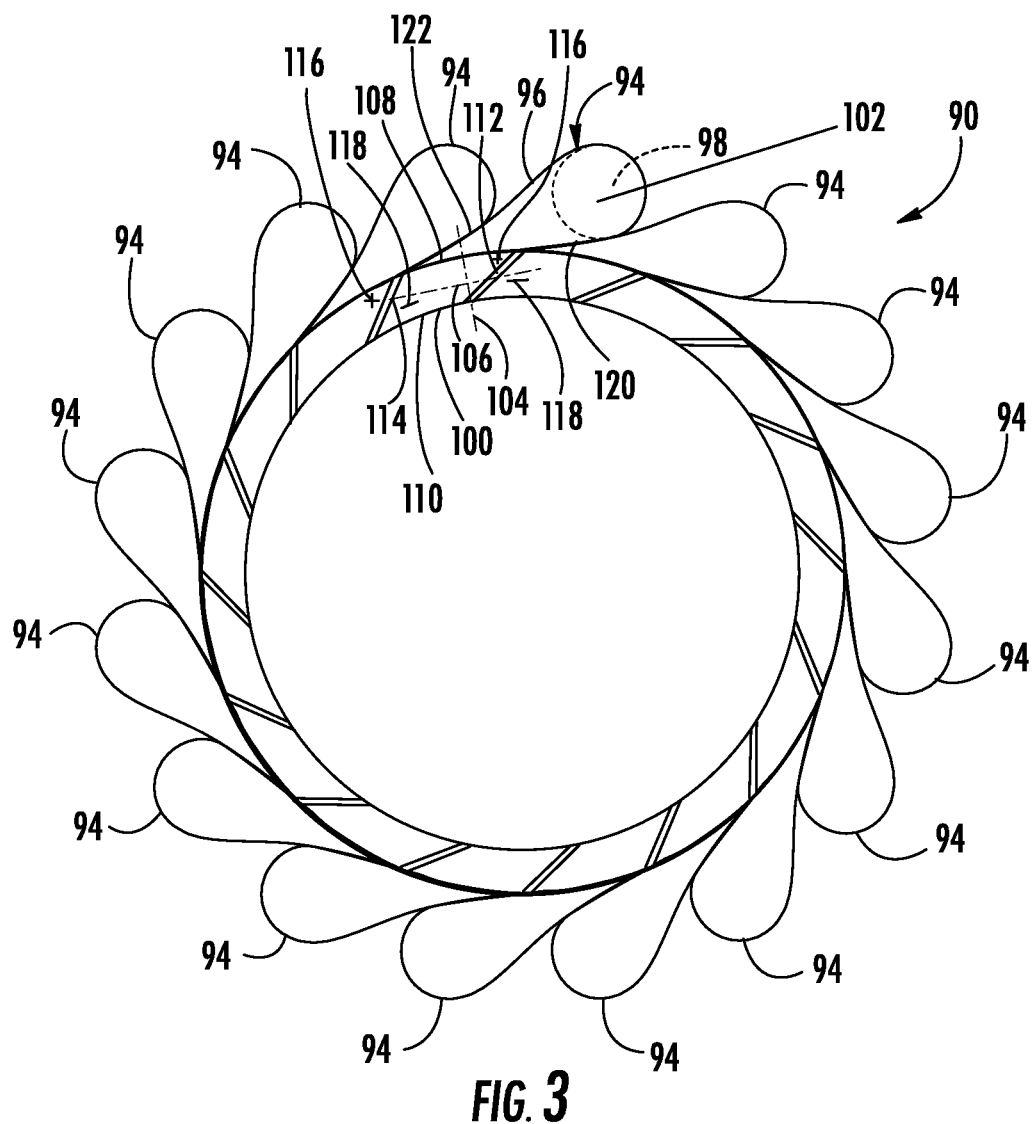
FIG. 3 is an upstream longitudinal view of a transition duct system in which a system in accordance with aspects of the invention can be used.
Figure 4:
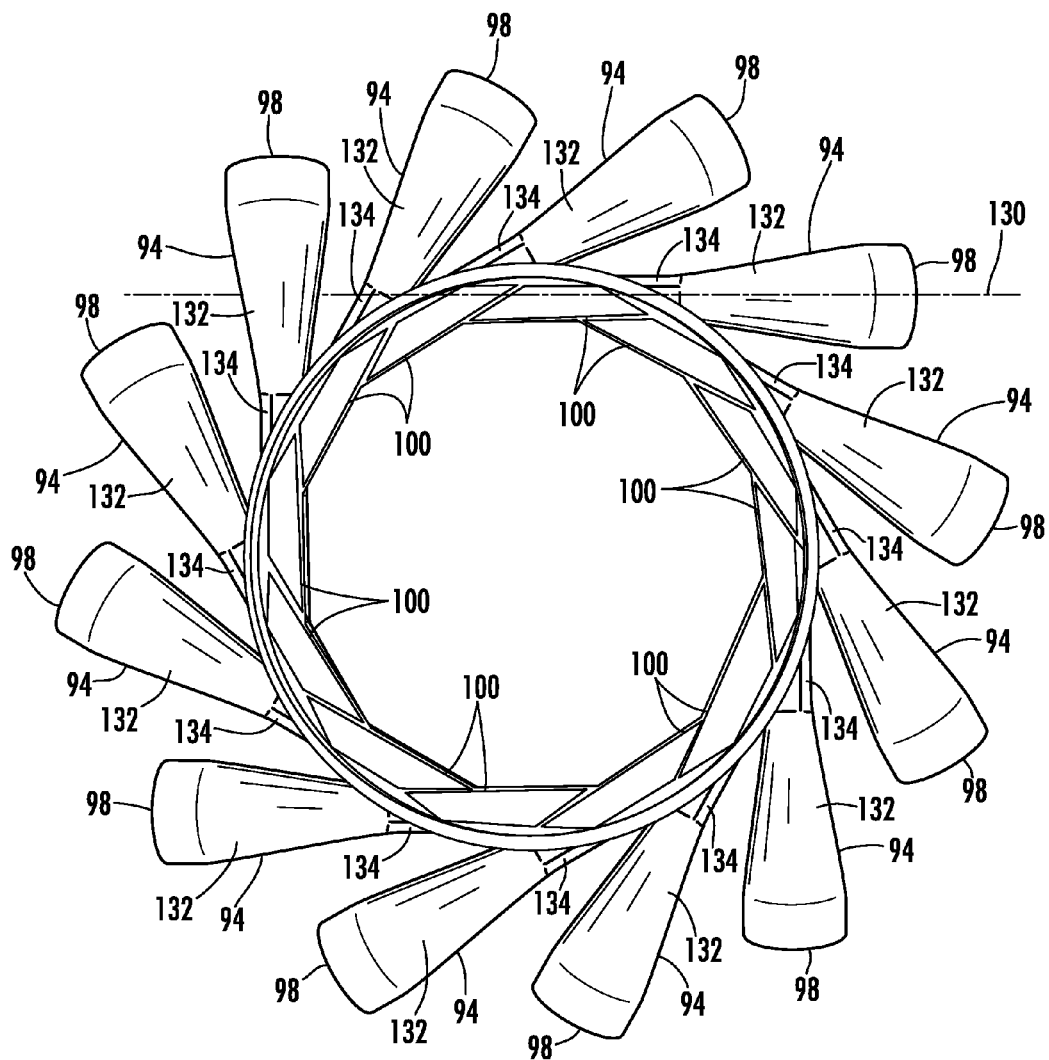
FIG. 4 is an upstream longitudinal view of a transition duct system in which a system in accordance with aspects of the invention can be used.
Figure 6:
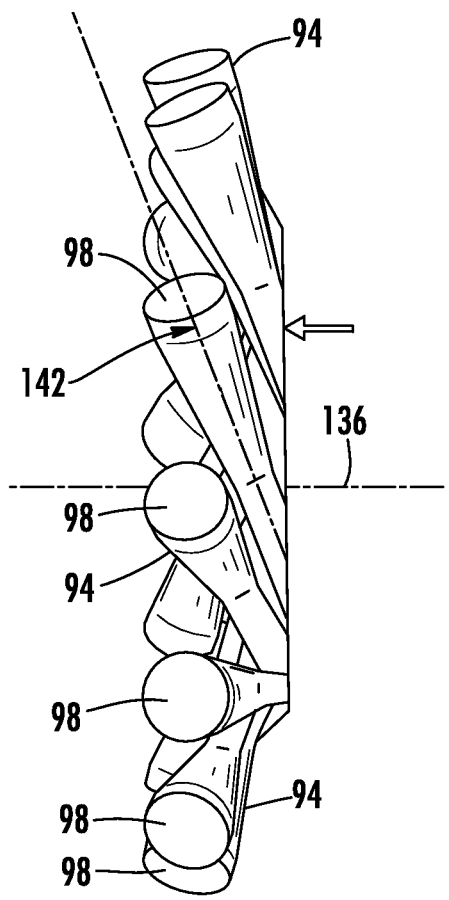
FIG. 6 is a top view of a transition duct system in which a system in accordance with aspects of the invention can be used.

As shown in FIGS. 3, 4 and 6, the transition ducts 94 may be positioned in an annular array 90, as shown without surrounding turbine components in an elevation as viewed from longitudinally downstream in a turbine. Each transition duct 94 can include a transition body 96 having an inlet 98 and an outlet 100 and an internal passage 102 between the inlet 98 and the outlet 100 for routing a gas flow through the transition duct 94 from the inlet 98 to the outlet 100. The array 90 shown in FIGS. 4 and 6 illustrates an arrangement for use in a combustion turbine engine having 12 combustors. However, the number of transition ducts 94 and their annular arrangement can be varied for use with more or less combustors.

Figure 5:
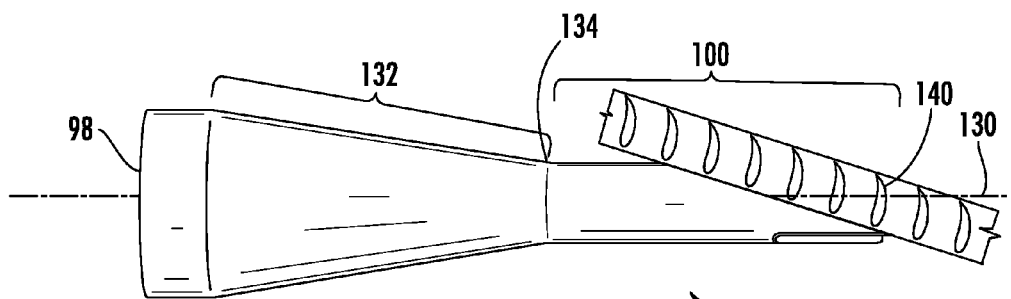
FIG. 5 is a side view of a transition duct in which a system in accordance with aspects of the invention can be used.

As shown in FIG. 3-5, the transition duct 94 may include an outlet 100 formed from a radially outer side 108 generally opposite to a radially inner side 110 and configured to match the row one blade annulus. The radially outer side 108 may be positioned radially outward a distance equal to the OD of an adjacent row one turbine blade. The radially inner side 110 may be positioned radially outward a distance equal to the ID of an adjacent row one turbine blade. The radially outer and inner sides 108, 110 may be coupled together with opposed first and second side walls 112, 114. The outlet 100 may be offset from the inlet 98 in the longitudinal direction. The term "offset" as used herein means that the outlet is spaced from the inlet as measured along the coordinate direction(s) identified. The outlet 100 may also be offset from the inlet 98 in a tangential direction 106, as shown in FIG. 3. The outlet 100 may also be configured such that the outlet 100 is generally orthogonal to a longitudinal axis 136 of the turbine engine such that the transition duct 94 does not interfere with the row one turbine blades, as shown in FIG. 6.

Figure 7:
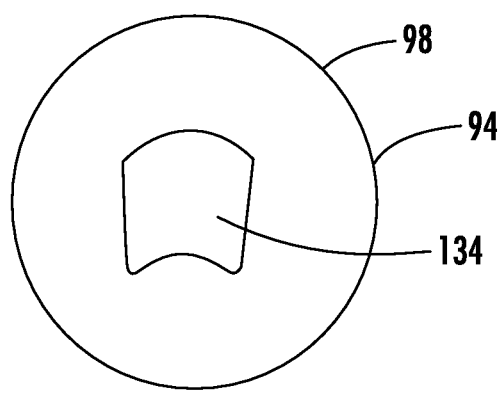
FIG. 7 is an end view of the transition duct of FIG. 6.

The transition duct 94 may be configured to direct gases along a generally linear flow path along the transition axis 130. In one embodiment, the transition duct 94 may have a generally cylindrical inlet 98 adjacent to a conical midsection 132. The conical midsection 132 may be positioned between the inlet 98 and the throat 134. The conical midsection 132 may include an ever decreasing cross-sectional area until the conical midsection 132 joins an adjacent throat 134. The conical midsection 132 accelerates the flow of gases before the gases are directed into the row one turbine blades 140, as shown in FIG. 5. Accelerating the flow of gases before the gases strike the row one turbine blades increases the efficiency of the turbine engine. The throat 134 may have any appropriate cross-section. In at least one embodiment, the throat 134, as shown in FIG. 7, may have a cross-section with two opposing, generally linear sides and two opposing, nonlinear sides. The cross-sectional area of the throat 134 may be less than a cross-sectional area of the conical midsection 132.

Figure 8:
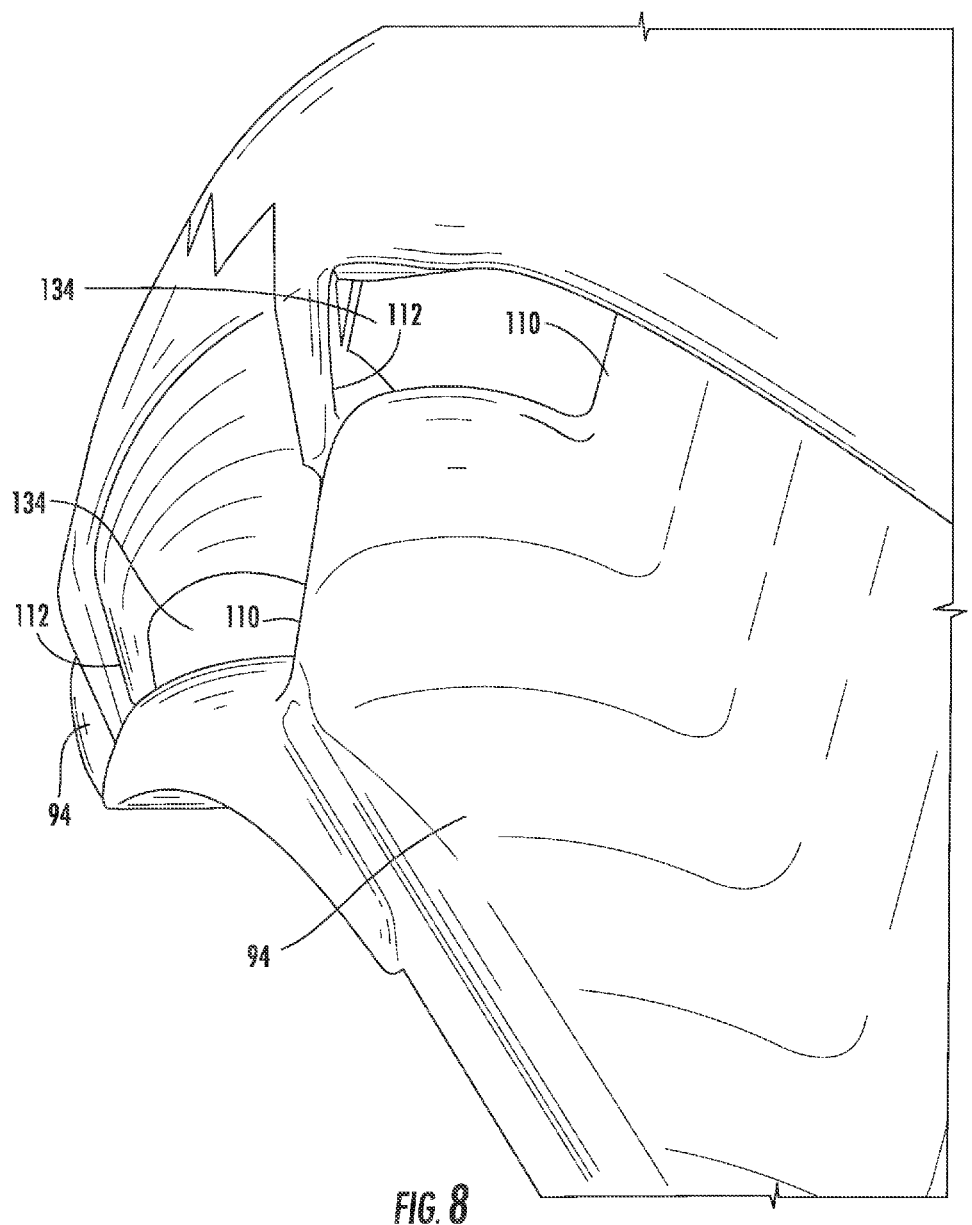
FIG. 8 is a partial perspective view of two transition ducts of a transition duct system in which a system in accordance with aspects of the invention can be used.

As shown in FIG. 8, the transition ducts 94 may be formed from first and second opposing side walls 112, 114. A first side wall 112 of a first transition duct 94 may be positioned such that an inner surface of the first side wall is substantially coplanar with an inner surface of the second side wall 114 of an adjacent transition duct 94.

As shown in FIG. 3, the first side wall 112 may be canted relative to a radial axis 104 when viewing the outlet longitudinally upstream. The second side wall 114 may be canted relative to the radial axis 104 when viewing the outlet longitudinally upstream. In one embodiment, the first and second side walls 112, 114 may be canted between about 20 and about 70 degrees relative to the radial axis 104 when viewing the outlet longitudinally upstream. More particularly, the first and second side walls 112, 114 may be canted between about 30 and about 60 degrees relative to the radial axis 104 when viewing the outlet longitudinally upstream. In one embodiment, as shown in FIG. 3, the second side wall 114 may be nonparallel to the first side wall 112 of the outlet 100.

The first and second side walls 112, 114 may be canted as shown in FIGS. 3 and 4 to reduce the affects of the pressure differential between high pressure regions, denoted by the plus sign 116, and the low pressure regions, denoted by the minus sign 118. The high and low pressure regions 116, 118 exist within the same transition but in different portions of the cross-section. Such is the case because as the hot combustor gases flow quickly and accelerate through the transition 94.

Inclusion of the canted first and second sides 112, 114 in the outlet 100 facilitates an increased incidence angle 142, which is the angle shown in FIG. 6 between an axis orthogonal to the longitudinal axis 136 and the linear flow path at the outlet 100 of the transition 94. A higher incidence angle, which is an angle at which the discharge gas flow path is moving further way from alignment with the longitudinal axis 136, facilitates positioning the transition duct 94 at improved angles of discharge of the combustor gases to downstream turbine blades.

During operation, hot combustor gases flow from a combustor into inlets 98 of the transitions 94. The gases are directed through the internal passages 102. The position of the transition duct 94 is such that gases are directed through the inlet 98, the conical midsection 132, and the adjacent throat 134 and are expelled out of the outlet 100. The gases are expelled at a proper orientation relative to the turbine blades such that the gases are directed into the turbine blades in correct orientation without need of row one turbine vanes to alter the flow of the gases. Thus, energy is not lost through use of row one turbine vanes. In transition ducts 94 with linear flow paths, the gases are exhausted through the outlets 100. The canted first and second sides 112, 114 of the outlet 100 distribute the wake across a downstream turbine blade. In particular, the wake is distributed from a pressure side, across a leading edge of the blade, to a suction side, thereby distributing the wake across the entire blade. Such a configuration reduces vibrations and stresses in the downstream, stationary turbine blades.

Another example of a transition system that supplies combustion gases with high tangential velocity directly to a first row of blades is described in U.S. Patent Application Publication No. 20070017225, which is incorporated herein by reference.

Figure 9:
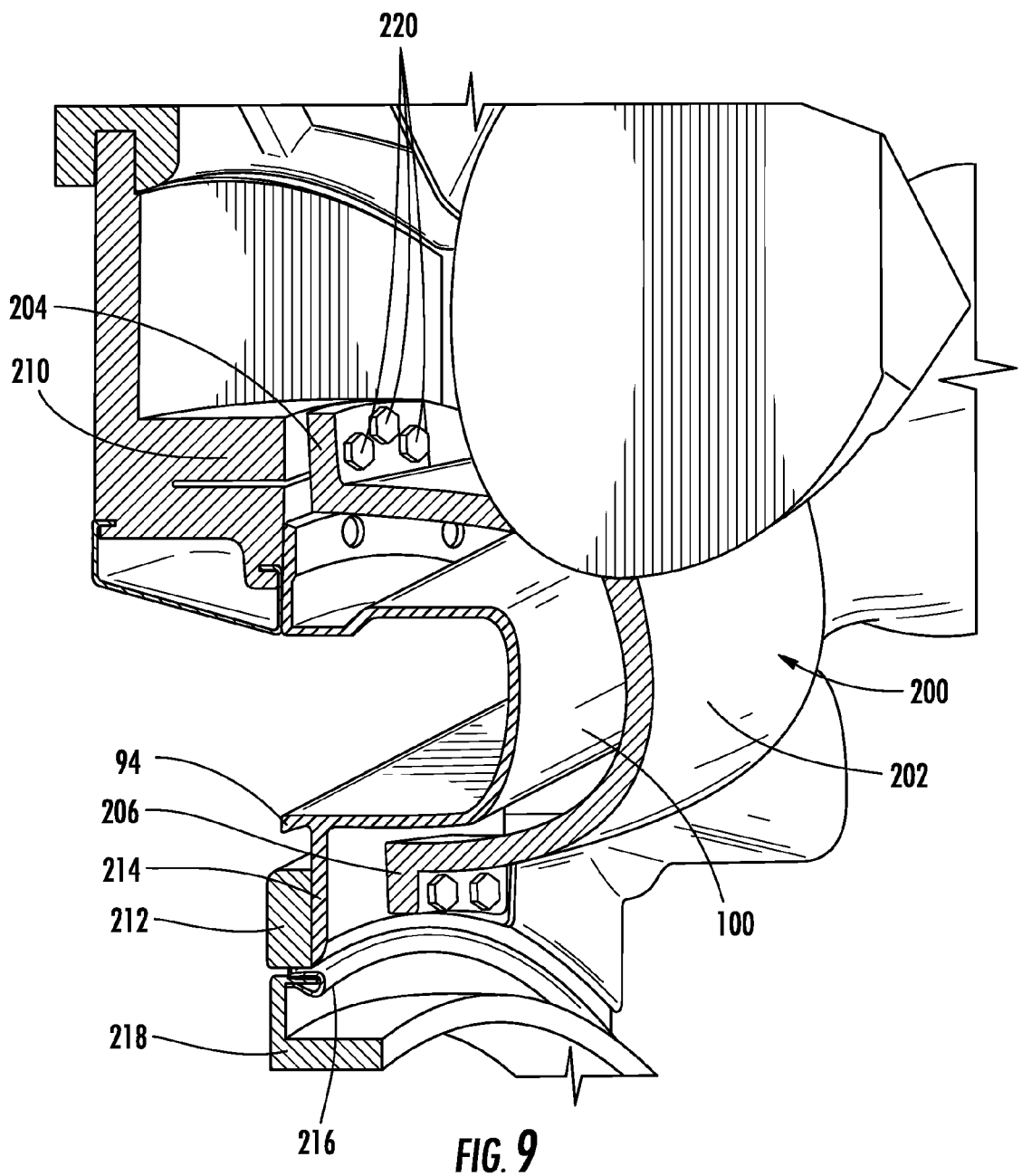
FIG. 9 is a partial cross-sectional perspective view of a transition duct structural attachment system according to aspects of the invention.

One assembly of a system according to aspects of the invention will now be described in connection with FIGS. 2, 9 and 10. The structural attachment member 200 can be secured to any suitable structures in a turbine engine. For instance, the outer flange 204 can be secured to the turbine vane carrier 210. In one embodiment, the inner flange 206 can be secured to an ID ring 212 that joins all transition ducts 94, as is shown in FIG. 9. In such case, a portion of the transition duct 94, such as a flange portion 214, can be sandwiched between the inner flange 206 and the ring 212. In such case, the structural attachment member 200 can provide a rigid support for a seal 216 that allows the rotor shaft cover 218 to move independently. Any suitable seal can be used. In one embodiment, the seal 216 can be a clip seal. The seal 216 can be disposed between and in operative engagement with the rotor shaft cover 218 and the ID ring 212 and/or the transition duct 94. In another embodiment (not shown), the inner flange 206 can be secured directly to the rotor shaft cover 218.

The structural attachment member 200 can be secured to these structures in any suitable manner. For instance, the structural attachment member 200 can be secured to these structures by one or more fasteners. In one embodiment, the fasteners can be bolts 220.

Figure 2:
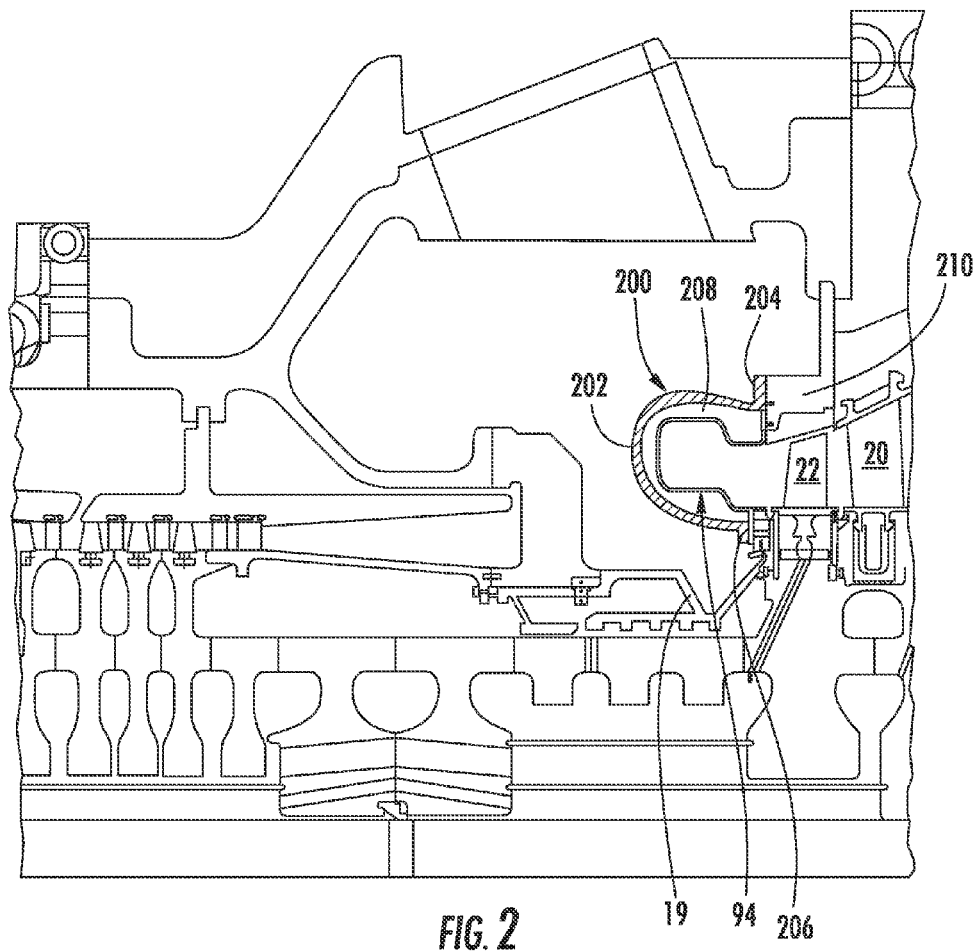
FIG. 2 is a cross-sectional view through a portion of a turbine engine without a stage 1 row of vanes, showing a structural attachment piece in accordance with aspects of the invention, the combustors and transition ducts being removed for clarity.
Figure 10:
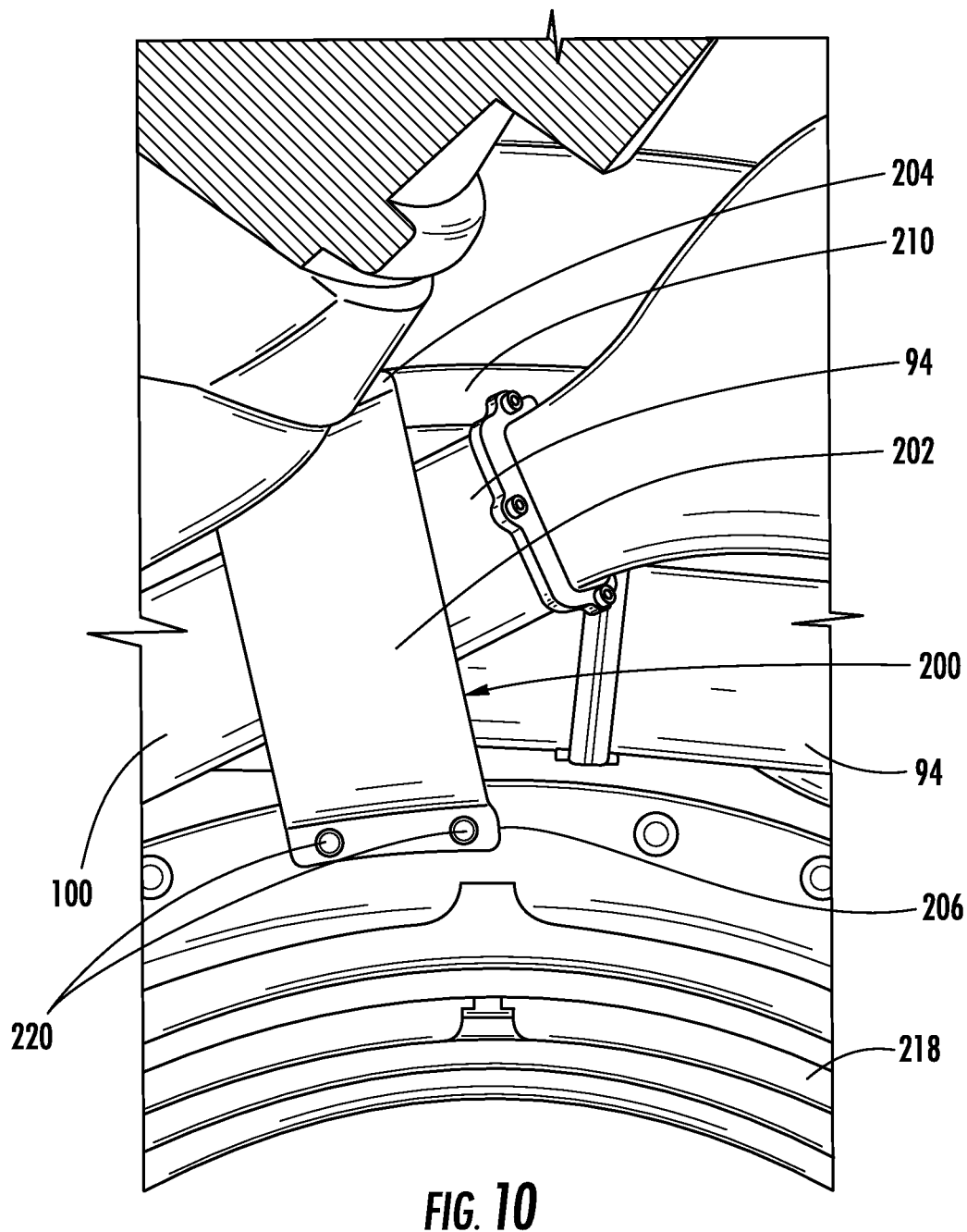
FIG. 10 a downstream longitudinal view of a transition duct structural attachment system according to aspects of the invention.

When assembled, at least a portion of the outlet of one or more of the transition ducts 94 can be received within the step over portion 202 of the structural attachment member 200, as is shown in FIGS. 2, 9 and 10. The system according to aspects of the invention can hold the outlet 100 of the transition duct 94 in a rigid position, particularly when the structural attachment member 200 is attached to the ID ring 212. When attached, the step over portion 202 projects generally in the axial upstream direction, that is, away from the turbine section.

Because the structural attachment member 200 extends around or steps over the outlet 100 of the transition duct 94, it is no longer constrained circumferentially to fitting in between two neighboring transition ducts. Thus, the structural attachment member 200 can be made wider than in previous efforts, such as described in U.S. Patent Application Publication No. 20080008584. As a result, the structural attachment member 200 can have increased rigidity and structural capability to overcome the thermal displacement issues occurring at or near the outlet 100 of the transition duct 94. The structural attachment member 200 can provide support for the ID of the transition ducts. Further, the system can manage the thermal displacements between the transitions, rotor shaft cover and first row of blades during transient engine operation by closely maintaining the distance between ID and OD flow path surfaces at turbine inlet to the first row of blades. As a result, improved sealing can be realized by simpler designs and reduced leakage. The system according to aspects of the invention can be implemented without significantly affecting other structures. Therefore, it can be used as an add on with the existing configuration. The system according to aspects of the invention can be used in connection with each transition duct in the engine or less than every transition duct in the engine.

The foregoing is provided for purposes of illustrating, explaining, and describing embodiments of this invention. Thus, it will of course be understood that the invention is not limited to the specific details described herein, which are given by way of example only, and that various modifications and alterations are possible within the scope of the invention as defined in the following claims.

What is claimed is:

1. A structural attachment system for a transition duct outlet comprising:
   a radially outer support structure;
   a radially inner support structure; and
   a structural attachment member having a step over portion with an outer flange at a first end of the step over portion and an inner flange at a second end of the step over portion, the outer flange being attached to the radially outer support structure and the inner flange being attached to the radially inner support structure such that the step over portion extends away from the support structures in a generally axial direction.

a transition duct having an outlet, wherein at least a portion of the outlet and the transition extend through a cavity formed by the step over portion, wherein the inner flange is attached to the radially inner support structure and a portion of the transition duct such that the portion of the transition duct is sandwiched between the inner flange of the structural attachment member and the radially inner support structure.

2. The system of claim 1 wherein the outer flange being attached to the radially outer support structure by fasteners, and wherein the inner flange being attached to the radially inner support structure by fasteners.

3. The system of claim 1 wherein the radially outer support structure is a turbine vane carrier.

4. The system of claim 1 wherein the radially inner support structure is a transition duct ID support ring.

5. The system of claim 4 further including:
 a rotor shaft cover circumferentially surrounded by the transition duct ID support ring; and
 a seal positioned between and operatively engaging the rotor shaft cover and the transition duct ID support ring.

6. The system of claim 1 wherein the radially inner support structure is a rotor shaft cover.

7. The system of claim 1 wherein the step over portion has a cross-section that is one of u-shaped, v-shaped and c-shaped.

8. The system of claim 1 wherein the step over portion has a cross-section that is one semi-circular, semi-oval, parabolic, or bowed.

9. A structural attachment system for a transition duct outlet comprising:
 a radially outer support structure;
 a radially inner support structure; and a structural attachment member having a step over portion with an outer flange at a first end of the step over portion and an inner flange at a second end of the step over portion, the outer flange being attached directly to the radially outer support structure via fasteners and the inner flange being attached to the radially inner support structure via fasteners such that the step over portion extends away from the support structures in a generally axial direction; and
 a transition duct having an outlet, wherein at least a portion of the outlet being received in the step over portion, wherein the inner flange is attached to the radially inner support structure and a portion of the transition duct such that the portion of the transition duct is sandwiched between the inner flange of the structural attachment member and the radially inner support structure such that the fasteners extend through the portion of the transition duct sandwiched between the inner flange and the radially inner support structure.

10. The system of claim 9 wherein the radially outer support structure is a turbine vane carrier.

11. The system of claim 9 wherein the radially inner support structure is a transition duct ID support ring.

12. The system of claim 11 further including:
 a rotor shaft cover circumferentially surrounded by the transition duct ID support ring; and
 a seal positioned between and operatively engaging the rotor shaft cover and the transition duct ID support ring.

13. The system of claim 9 wherein the radially inner support structure is a rotor shaft cover.

14. The system of claim 9 wherein the step over portion has a cross-section that is one of u-shaped, v-shaped and c-shaped.

15. The system of claim 9 wherein the step over portion has a cross-section that is one semi-circular, semi-oval, parabolic, or bowed.

* * * * *